March 17, 1936.  M. P. SCHELL  2,034,155

WHEEL MOUNT

Filed May 20, 1935  2 Sheets-Sheet 1

Inventor

M. P. Schell

By Clarence A. O'Brien
Attorney

March 17, 1936.  M. P. SCHELL  2,034,155
WHEEL MOUNT
Filed May 20, 1935  2 Sheets-Sheet 2

Inventor
M. P. Schell
By Clarence A. O'Brien
Attorney

Patented Mar. 17, 1936

2,034,155

UNITED STATES PATENT OFFICE 2,034,155

WHEEL MOUNT

Marion P. Schell, Huntington, Ind.

Application May 20, 1935, Serial No. 22,472

2 Claims. (Cl. 267—19)

This invention appertains to new and useful improvements in wheel mounts for trailers and other vehicles employing non-steerable wheels.

The principal object of the present invention is to provide a wheel mount which will afford a more or less "floating" ride of the vehicle, even on rough road surfaces.

Another important object of the invention is to provide a structure which will afford a more even travel of a wheeled vehicle wherein the parts are of simple construction and not susceptible to the development of ready defects.

These and numerous other important objects of the invention will become apparent to the reader of the following specification.

Figure 1:
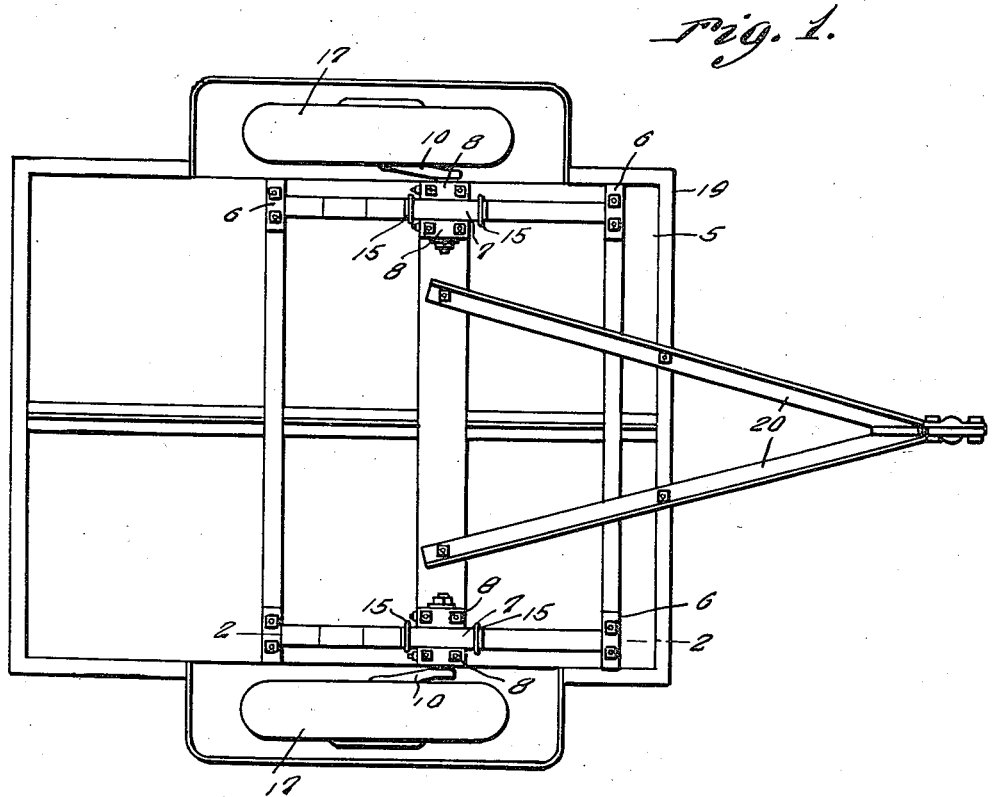
Figure 1 is a bottom plan view of a two-wheel trailer with the improved mount for the wheels thereon.
Figure 2:
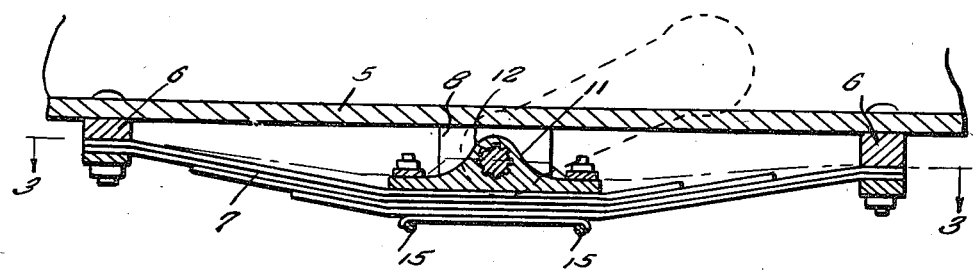
Figure 2 represents a sectional view taken substantially on line 2—2 of Figure 1.
Figure 3:
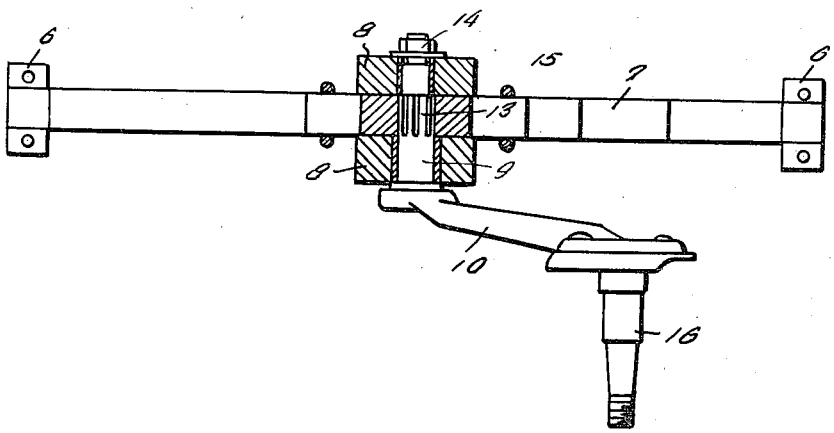
Figure 3 represents a sectional view taken substantially on line 3—3 of Figure 2.
Figure 4:
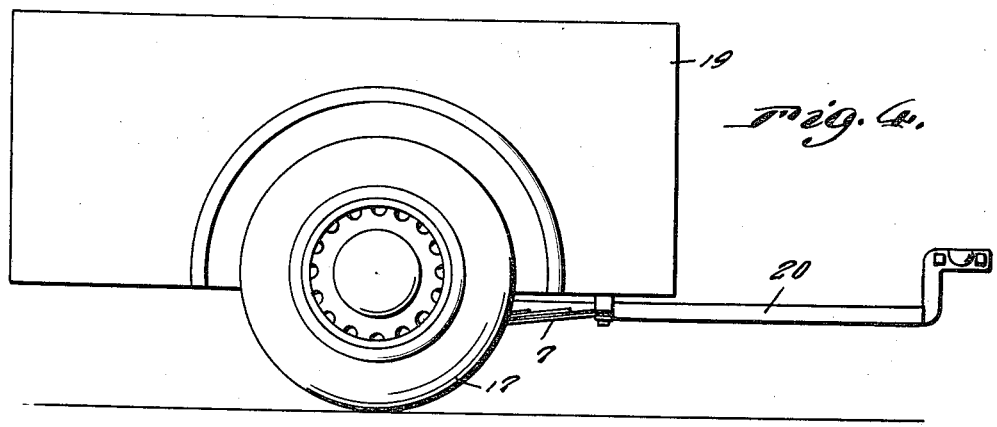
Figure 4 represents a side elevational view of a trailer equipped with the present invention.
Figure 5:
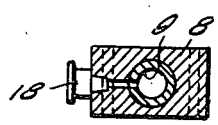
Figure 5 represents a sectional view through one of the bearing blocks.

Referring to the drawings wherein like numerals designate like parts, it can be seen in Figure 2 that numeral 5 represents the floor of a trailer, to the bottom side of which are clamp members 6—6 for clamping the ends of the leaf spring 7 in the proper position.

Numerals 8—8 represent bearing blocks through which the lateral stub shaft 9 on the arm 10 is journaled.

Numeral 11 represents an elongated body provided with an enlarged intermediate portion 12 having a splined bore therethrough in which engages the spline portion 13 of the stub shaft 9. Suitable retaining means 14 is provided to prevent displacement of the stub shaft 9 from the bearing blocks 8—8. The elongated body 11 is secured to the intermediate portion of the spring 7 by clamps 15 at the ends thereof. Numeral 16 represents the spindle on which the wheel 17 is mounted. The bearing blocks 8—8 may be provided with suitable grease cups 18 and of course the trailer proper may have any suitable type of body 19 and a tongue 20.

Obviously, when one wheel 17 strikes a bump in the roadway, it will rise without affecting the wheel on the other side of the trailer.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. In a vehicle, an elongated leaf spring attached by its ends to the vehicle, an arm provided with a laterally disposed stub shaft fixed to the intermediate portion of the said spring and provided with a laterally disposed spindle at its opposite end for supporting a wheel, said spring having an elongated body clamped thereto and an opening therethrough for receiving the stub shaft and a splined connection between the stub shaft and the elongated body.

2. In a vehicle, an elongated leaf spring attached by its ends to the vehicle, an arm provided with a laterally disposed stub shaft fixed to the intermediate portion of the said spring and provided with a laterally disposed spindle at its opposite end for supporting a wheel, said spring having an elongated body clamped thereto and an opening therethrough for receiving the stub shaft and a splined connection between the stub shaft and the elongated body, and a bearing on each side of the block through which the ends of the stub shaft are journaled.

MARION P. SCHELL.